United States Patent Office 2,873,265
Patented Feb. 10, 1959

2,873,265

PROCESS FOR PREPARING COPOLYMERS OF ORGANO SILICON DERIVATIVES

John B. Rust, Verona, N. J., assignor, by direct and mesne assignments, of one-half to Montclair Research Corporation, Montclair, N. J., a corporation of New Jersey, and one-half to Ellis-Foster Company, a corporation of New Jersey No Drawing. Application May 12, 1950
Serial No. 161,731

18 Claims. (Cl. 260—46.5)

The invention relates to copolymers of organo silicon derivatives and to methods of making the same. The specification is a continuation in part of Serial No. 611,685, filed August 20, 1945, now Patent No. 2,511,296, granted June 13, 1950, entitled "Copolymers of Silicon Derivatives."

It is known that esters of silicic acid may be hydrolyzed to form first a coherent, glassy mass, and then a silica sand on further removal of the alkoxy groups and dehydration. It is also known that alkyl silicon hydroxides will polymerize on dehydration to produce hard resins if the alkyl radical ratio to silicon is sufficiently low.

Among the objects of the present invention is the production of copolymerization products of organic substituted silicon derivatives or organic substituted silanes one of which reactants contains an Si—H bond and another of which reactants does not contain an Si—H bond.

Further objects include the production of copolymers of alkyl silicon derivatives or alkyl silane derivatives with a polymeric derivative having the nature or structure of an organo silicoformic acid, that is, a polymer containing hydrogen bonded directly to silicon.

Further objects include the production of homogeneous composite resins composed of the copolymerization products of an organo silicoformic acid with organic silicon derivatives or silane derivatives, particularly alkyl silicon and silane derivatives.

Still further objects and advantages of the present invention will appear from the more detailed description set forth below, it being understood that this more detailed description is given by way of illustration and explanation only and not by way of limitation, since various changes therein may be made by those skilled in the art without departing from the scope and spirit of the present invention.

In accordance with the present invention, copolymerization products are produced from an organo silicon halide having an Si—H bond with a non-Si—H containing organo silicon halide particularly where organo and halogen groups only are attached to silicon. The production of such copolymerization products enables the utilization of relatively inexpensive materials in the production of stable, coherent, resinous products having high heat stability, good color, and chemical resistance. The Si—H containing compound may be represented by the formula $R_rSiHX_{3-r}$. R is one or more monovalent hydrocarbon radicals depending on the value of $r$ which may be from 1 to 2, and where more than one hydrocarbon group is present, such hydrocarbon groups may be the same or different selected from alkyl, alkenyl, cycloalkyl, aryl, alkaryl and aralkyl groups. X is halogen illustrated by chloride although the other halogens may be present and when $3-r$ is 2 such halogens may be the same or different. The non-Si—H containing reactant may be represented by the formula $R'_tSiX_{4-t}$ where R' is one or more monovalent hydrocarbon radicals depending on the value of $t$ which may be from 1 to 3 and where more than one hydrocarbon group is present, such hydrocarbon groups may be the same or different selected from alkyl, alkenyl, cycloalkyl, aryl, alkaryl and aralkyl groups. X is halogen illustrated by chlorine although the other halogens may be present and where $4-t$ is 2 or 3 such halogens may be the same or different. These copolymerizing compounds of organic silicon or silane derivatives as set forth above, may carry substituted groups such as alkyl, aryl, alkynyl, alkenyl, aralkyl, alkaryl, non-aromatic carboxylic groups such as cycloalkyl, and the like, and one or more of such groups may be present as where all of the substituted groups are the same, or different groups are present to produce mixed derivatives. Such substituent groups are illustrated by methyl, ethyl, propyl, isopropyl, butyl, i-butyl, t-butyl, amyl, hexyl, heptyl, octyl, vinyl, allyl, nonyl, decyl, dodecyl, tetradecyl, hexadecyl, octadecyl, methallyl, butenyl, cyclohexyl, benzyl, phenyl, tolyl, xylyl, xenyl, chlorphenyl, styryl, radicals from acetylene, methyl acetylene, propyl acetylene, phenyl acetylene, and the like. As indicated by chlorophenyl, these various radicals may be substituted by substituents such as halogens like chlorine or bromine, etc., which are nonfunctional to the extent that they do not interfere with the copolymerization desired. Such reactants may be non-silicon derivatives or polysilicon derivatives such as are derivable from disilicon hexachloride, trisilicon octachloride and the like, or chlorosilane derivatives such as disilane tetrachloride, trisilane pentachloride, and the like.

These silane and silicon derivatives in preferred instances may be represented as follows: $RSiCl_3$, $R_2SiCl_2$, $R_3SiCl$, $RR'SiCl_2$, $RR'R''SiCl$, $RSiHCl_2$, $R_2SiHCl$, $RR'SiHCl$, and the like, where the various substituent groups represented by R, R', R" may be any of the organo groups indicated above. For purposes of illustration, the chlorine derivatives are used but in lieu of chlorine in the formulas set forth above, other halogens may be present.

The formulations as illustrated above for reacting components of this invention, are not offered by way of limitation but only as a possible explanation, since the invention may be interpolated in view of these suggested formulations; but other theoretical considerations may also come into play.

Various methods and materials may be utilized to produce the copolymerization products of the present invention all leading however to substantially the same results subject to special variations under particular conditions. Thus the selected reacting materials are copolymerized, for example, by cohydrolysis and codehydration. Various examples will be given below to illustrate such methods without limitation to the scope of the invention other than as defined in the appended claims. The proportions of reactants may vary but there should be present a sufficient amount of the halosilane having an Si—H bond to influence the characteristics of the ultimate copolymerized material to the desired extent. The amount of such derivative present in the copolymer will under some circumstances determine the hardness or viscosity of the final copolymerization product. Thus, with relatively large amounts of Si—H containing reactant in the copolymer, the products are hard, brittle, resinous materials. Decreasing the amount of the Si—H containing reactant or halosilane having an Si—H bond results in softer products which in some cases are liquids. In general, desired results are obtained with ratios of from 2:1 to 1:3 by weight of Si—H reactant to non-Si—H reactant. These ratios include the cases where one or more Si—H reactants are used with one or more non-Si—H reactants.

Thus the nature of the product obtained will be determined by the type of substituent organic group such as alkyl group in the compounds undergoing treatment, by the number of such substituent organic groups, and the proportion of copolymerizing compound used with the organo silicohaloform specifically Si—H containing reactant; proportions of particular compounds may thus be chosen to control the type of product desired.

The hydrolysis of the two types of reactants, while in some cases may be carried out separately and the hydrolyzed reactants mixed, it is more desirable to cohydrolyze the reactants so that the copolymer is formed from the mixed hydrolysis products. Water is a satisfactory hydrolyst and may be used relatively cold as in the form of ice, or mixed ice and water or as water at a temperature of from 0° to 5° or 10° C. Higher temperatures such as up to 50 or 60° C. may be used in some cases. An organic liquid solvent may be present such as ethers, ketones, etc. The hydrolysis is desirably carried out under conditions to retain the Si—H bond in the copolymer.

In the following illustrative examples, all parts are given by weight.

*Example 1.*—Two parts of silicochloroform and three parts of methyl silicon trichloride were added to 15 parts of diethyl ether. The ether solution was then poured on ice. The hydrolyzed product remained in the ether layer and the mixture was separated from the water and dried over sodium sulfate. A sample of the product was poured on a glass plate. After evaporation of the ether a clear film was obtained which hardened in a few minutes.

*Example 2.*—One part of silicochloroform and one part of di-n-butyl silicon dichloride were placed in 10 parts of ether. The resulting mixture was hydrolyzed by pouring it on ice. The ether layer was separated and dried over $Na_2SO_4$. A film, poured on a glass plate, was heated to 170° C. for 4 hours. A clear, hard film was thus obtained.

*Example 3.*—One part each of silicochloroform, methyl silicon-trichloride and di-n-butyl silicon dichloride were placed on 15 parts of ether. The mixture was hydrolyzed by pouring on ice. It was then separated and dried over $Na_2SO_4$. A film, poured on a glass plate, was heated for 3 hours at 150° C. A clear, hard film was obtained.

*Example 4.*—One part of a crude mixture obtained in the preparation of silicochloroform (essentially 80% silicochloroform and 20% silicon tetrachloride) and two parts of di-n-butyl silicon dichloride were placed in 10 parts of ether. The mixture was hydrolyzed by pouring on ice. It was separated from the water layer and dried over $Na_2SO_4$. A film was poured on a glass plate and left at 50° C. for 16 hours. A clear, non-tacky, soft film was obtained.

*Example 5.*—One part of silicochloroform and one part of phenyl silicon trichloride were placed in 10 parts of ether. The mixture was hydrolyzed on ice, separated from the water and dried over $Na_2SO_4$. A film, poured on a glass plate, was heated at 140° C. for 2 hours. A clear, hard film was obtained.

*Example 6.*—One part each of silicochloroform, phenyl silicon trichloride and di-n-butyl silicon dichloride were mixed and added to 15 cc. of ether. The mixture was hydrolyzed by pouring on ice. It was separated from the water layer and dried over $Na_2SO_4$. A film, poured on a glass plate, was heated at 140° C. for 2 hours. A clear, hard film was obtained.

*Example 7.*—One part of mono-n-butyl dichlorosilane and one part of silicochloroform were added to 10 parts of ether. The mixture was poured on ice and the ether layer was separated and dried over $Na_2SO_4$. A portion of the product was poured on a glass plate. The plate was heated for two hours at 120° C. A clear, hard film was obtained.

*Example 8.*—Two parts of mono-n-butyl dichlorosilane and one part of silicon tetrachloride were added to 10 parts of ether. The mixture was hydrolyzed by pouring on ice. The ether layer was separated and dried over $Na_2SO_4$. A portion of the mixture was poured on a glass plate and heated at 160° C. for 2 hours. A clear, hard film was obtained.

*Example 9.*—Three parts of triethylsilicomonochloride and three parts silicochloroform were mixed with thirty parts of ethyl ether and hydrolyzed by vigorous stirring with 100 parts of crushed ice. After coming to room temperature the ether layer was separated and dried over sodium sulfate until solution was clear. Fifty parts of ethyl acetate were added to the solution and the ether was distilled off, together with twenty parts of the ethyl acetate. From the resulting solution films were poured on glass and baked in the oven for one hour at 150° C. Hard brittle films were formed.

*Example 10.*—One part of mono-n-butyl dichlorosilane, one part of di-n-butyl silicon dichloride and two parts of ethyl silicon trichloride were added to 10 parts of ether. The mixture was hydrolyzed by pouring on ice and the ether layer was separated and dried over $Na_2SO_4$. A sample was poured on a glass plate and the plate was heated for 2 hours at 120° C. A soft, sticky film was obtained. Heating was continued for another hour at 160° C. A clear, hard film was obtained.

*Example 11.*—One part of mono-n-butyl dichlorosilane, and one part of methyl silicon trichloride were added to 10 parts of ether. The mixture was poured on ice and the ether layer, containing the silicol mixture, was dried over $Na_2SO_4$. A sample poured on glass, was heated at 120° C. for 2 hours. A clear, hard film was obtained.

In the examples particularly 10 and 11 as set forth above the Si—H containing reactant may be replaced for example by any one or more of the following: a monoalkyl dihalosilane; a dialkyl monohalosilane, a monoalkenyl dihalosilane, a monoaryl dichlorosilane, a diaryl monochlorosilane, a mono-aralkyl dichlorosilane, a diaralkyl monochlorosilane, or these stated compounds where bromine replaced chlorine in whole or in part, and similar compounds where mixed hydrocarbon radicals are present, such Si—H reactants being represented by monomethyl dichlorosilane, monoethyl dichlorosilane, monobutyl dichlorosilane and similar dichlorosilanes containing a mono-higher alkyl substituent such as decyl, dodecyl, tetradecyl, octadecyl, etc.; dimethyl monochlorosilane, diethyl monochlorosilane, dibutyl monochlorosilane, dioctyl monochlorosilane and similar dichlorosilanes containing di-higher alkyl substituents as decyl, dodecyl, hexadecyl, etc.; monoalkenyl dichlorosilanes such as mono-allyl dichlorosilane and monomethallyl dichlorosilane; and aryl chlorosilanes and aralkyl chlorosilanes such as monophenyl dichlorosilane, diphenyl monochlorosilane, monobenzyl dichlorosilane, dibenzyl monochlorosilane, etc. Thus the mono-n-butyl dichlorosilane in any of the examples given above, particularly Examples 10 and 11 may be replaced by an equivalent amount of any one or more of the Si—H reactants set forth immediately above.

In the examples above, particularly 10 and 11, the non-Si—H containing reactant may be replaced for example by an organo silicon halide having organo and halogen groups only attached to silicon, thus in examples 10 and 11 the dibutyl silicon chloride or methyl silicon trichloride may be replaced by an equivalent amount of reactant or mixture of reactants for example; from the following: A monoalkyl trichlorosilane such as methyl trichlorosilane, ethyl-, chlorethyl-, propyl-, i-propyl-, butyl-, i-butyl-, t-butyl-, amyl-, hexyl-, octyl-, nonyl-, dodecyl-, myristyl-, trichlorosilanes or tribromosilanes; a mono-alkenyl trichlorosilane such as mono-vinyl trichlorosilane, mono-allyl trichlorosilane, mono-methallyl trichlorosilane; a mono-aryl trichlorosilane such as monophenyl trichlorosilane, monotolyl trichlorosilane, monochlorophenyl trichlorosilane, mono-bromphenyl trichlorosilane, mono-α-naphthyl trichlorosilane; mono-aralkyl dichlorosilanes such as mono-benzyl dichlorosilane, monochlorbenzyl trichlorosilane; and mono-cyclo-alkyl trichlorosilanes such as mono-cyclo-hexyl benzene; a di-alkyl dichlorosilane such as dimethyl-, diethyl-, ethyl propyl-, dipropyl-, amyl- methyl-, 2-pentylmethyl-, di-butyl-, dioctyl-, di-dodecyl, and higher diallkyl-dichlorosilanes; di-alkenyl dichlorosilanes such as divinyl dichlorosilane, diallyldichlorosilane, and mixed alkyl-alkenyl dichlorosilanes such as methyl vinyl dichlorosilane, methyl allyl dichlorosilane, etc; diaryl dichlorosilanes such as diphenyl dichlorosilane, di-p-tolyl dichlorosilane, etc.; mixed alkyl aryl dichlorosilanes such as methyl phenyl dichlorosilane, ethyl phenyl dichlorosilane, etc.; di-aralkyl dichlorosilanes, such as dibenzyl dichlorosilane; mixed alkyl-aralkyl or aryl-aralkyl dichlorosilanes such as ethyl benzyl dichlorosilane, phenyl-benzyl dichlorosilane, etc.; tri-organo monochlorosilanes such as tri-alkyl monochlorosilane including for example, tri-methyl-, triethyl-, tri-i-propyl-, tri-propyl-, tri-i-butyl-, di-ethyl- methyl- monochlorosilane, tri-organo monochlorosilanes where the organo groups are alkenyl or mixed alkyl alkenyl as in allyl dimethyl monochlorosilane; and tri-aryl- or tri-aralkyl- or tri-cyclo-alkyl-monochlorosilane including mixed group containing derivatives such as benzyl-diethyl monochlorosilane, ethyl propyl phenyl monochlorosilane, dibenzyl ethyl monochlorosilane, triphenyl monochlorosilane, dicyclohexyl monophenyl monochlorosilane, tribenzyl monochlorosilane, and tri-p-tolyl monochlorosilane. Thus the dibutyl dichlorosilane or methyl trichlorosilane in Examples 10 and 11 may be replaced by any equivalent amount of any one or more of the non-Si—H containing groups set forth immediately above.

In using any one or more Si—H reactants and any one or more non-si—H reactants in lieu of the reactants of Examples 10 and 11, the same equivalent quantities may be used as in those examples under the reaction conditions there given, or the ratio of the two types of reactants (Si—H compound to non-Si—H compound) is desirably kept at from 2:1 to 1:3 by weight.

The materials of the present invention may be used for a large number of applications. They may be dissolved in a solvent or composite solvent and used as lacquers, varnishes, impregnating varnishes, insulating varnishes, protective coatings, molding compositions, and the like. For such purposes they may be blended with other components such as natural resins including rosins, copal, shellac, etc., as well as synthetic resins including urea aldehyde, specifically urea formaldehyde, phenol aldehyde, melamine, aniline aldehyde, acetone formaldehyde, alkyd, cumarone-indene, resins, vinyl resins, and polymerized vinyl derivatives, allyl dibasic acid resins, acrylate and methacrylate resins, and with various cellulose derivatives including the ethers and esters, such as nitrocellulose and the organic esters of cellulose such as cellulose acetate, and the like, as well as with drying, semi-drying, and non-drying oils. These utilizations apply to the products whether partially polymerized or completely polymerized depending on the utilization that is to be made of the derivatives. They may be used as lubricating oils, or as additives to hydrocarbon oils for lubricating purposes, and for inclusion with the vegetable oils, particularly the drying oils such as linseed oil and chinawood oil, and the semi-drying oils such as soya bean oil, etc., as well as the non-drying oils including castor oil. With the vegetable or other glyceride oils they may be blended as by cooking. Various combinations of the indicated derivatives set forth above may be utilized for particular purposes.

They may be used in view of their electrical properties, in the production of varnishes or coatings for electrical insulation, as dielectric liquids, etc. They may be employed in the production of laminated products for bonding together two or more sheets of the same or different organic or inorganic materials.

For production of molding compositions, organic or inorganic fillers, may be impregnated with the polymerized or partially polymerized materials and utilized for molding purposes, as for example, in hot pressing operations. Fillers for these purposes may be inorganic materials, such as the various inorganic fillers, mica, clays, asbestos, or the organic fillers including cellulose products, such as wood or wood fibers, cellulose fibers of various types, paper, etc.

As solvents for the products of the present invention to produce solutions for any of the purposes set forth above as in the production of lacquers, varnishes, impregnating compositions, coating compositions, or in the use of solutions of such reaction products for impregnation of fillers for hot pressing operations, etc., or for the production of solutions of such reaction products to preserve them for future use, a variety of solvents may be employed. Such solvents include hydrocarbon solvents, both aliphatic and aromatic such as hexane, benzene, toluene and so forth, ethers such as dimethyl, diethyl, diisopropyl, dibutyl ethers and cyclic ethers such as dioxan or diethers such as diethyl ether or ethylene glycol or mixed ethers, esters such as ethyl, butyl or amyl acetates, propionates, butyrates and the like. Solvents may be added during the reaction itself or at a later stage. When the use of a solvent is desired, it is sometimes advantageous to add the solvent to the reaction mixture before it is poured on ice when hydrolysis is being carried out.

Having thus set forth my invention, I claim:

1. The method of preparing copolymers which comprises cohydrolyzing by water the halogen only of an organosilicon halide having an Si—H bond with a non-Si—H containing organosilicon halide having organo and halogen groups only attached to silicon, all valences of silicon other than in Si—H bond being attached to halogen and to carbon of organo groups the ratio of the reactants being from 2:1 to 1:3 by weight.

2. The method as in claim 1 which includes the step of dehydrating the cohydrolysis product.

3. The method of claim 1 in which the non-Si—H containing compound has the formula $R'_tSiX_{4-t}$ where R is a monovalent hydrocarbon radical, $t$ is an integer from 1 to 3 and X is halogen.

4. The method of claim 1 in which the Si—H compound includes a compound which has the formula $Alkyl_rSiHCl_{3-r}$ where $r$ is an integer from 1 to 2.

5. The method of claim 1 in which the Si—H compound includes a compound which has the formula $Alkenyl_rSiHCl_{3-r}$ where $r$ is an integer from 1 to 2.

6. The method of claim 1 in which the Si—H compound includes a compound which has the formula $Aryl_rSiHCl_{3-r}$ where $r$ is an integer from 1 to 2.

7. The method of claim 1 in which the Si—H compound includes a compound which has the formula $Aralkyl_rSiHCl_{3-r}$ where $r$ is an integer from 1 to 2.

8. The method of claim 1 in which the non-Si—H compound includes a compound which is $Alkyl_tSiCl_{4-t}$ where $t$ is an integer from 1 to 3.

9. The method of claim 1 in which the non-Si—H compound includes a compound which is $Alkenyl_tSiCl_{4-t}$ where $t$ is an integer from 1 to 3.

10. The method of claim 1 in which the non-Si—H compound includes a compound which is $Aryl_tSiCl_{4-t}$ where $t$ is an integer from 1 to 3.

11. The method of claim 1 in which the non-Si—H compound includes a compound which is $Aralkyl_tSiCl_{4-t}$ where $t$ is an integer from 1 to 3.

12. The method of claim 1 in which the non-Si—H compound includes both alkyl and alkenyl groups attached to silicon.

13. The method of claim 1 in which the non-Si—H compound includes both alkyl and aryl groups attached to silicon.

14. The method of claim 1 in which the non-Si—H compound includes both alkyl and aralkyl groups attached to silicon.

15. The method of claim 1 in which the non-Si—H compound includes both aryl and aralkyl groups attached to silicon.

16. The method of claim 1 in which the non-Si—H compound includes cyclo alkyl attached to silicon.

17. The method of claim 1 in which the Si—H compound has the formula $R_rSiHX_{3-r}$ where R is a monovalent hydrocarbon radical, $r$ is an integer from 1 to 2, and X is halogen.

18. The method of claim 17 in which the non-Si—H containing compound has the formula $R'_tSiX_{4-t}$ where R is a monovalent hydrocarbon radical, $t$ is an integer from 1 to 3 and X is halogen.

References Cited in the file of this patent

UNITED STATES PATENTS

| | | |
|---|---|---|
| 2,386,259 | Norton | Oct. 9, 1945 |
| 2,448,556 | Sprung et al. | Sept. 7, 1948 |
| 2,507,413 | MacKenzie | May 9, 1950 |
| 2,507,414 | MacKenzie | May 9, 1950 |
| 2,511,296 | Rust | June 13, 1950 |
| 2,637,718 | Rust | May 5, 1953 |

OTHER REFERENCES

Jervis et al.: The Chemical Age 57, page 187.